Nov. 5, 1946.   T. A. COHEN   2,410,568
CONTROL APPARATUS
Filed Jan. 26, 1943

Theodore A. Cohen, INVENTOR,
BY Theodore W. Miller,
Attorney

Patented Nov. 5, 1946

2,410,568

UNITED STATES PATENT OFFICE 2,410,568

CONTROL APPARATUS

Theodore A. Cohen, Chicago, Ill., assignor, by mesne assignments, to Wheelco Instruments Company, Chicago, Ill., a corporation of Illinois Application January 26, 1943, Serial No. 474,041

11 Claims. (Cl. 122—448)

This invention relates to control apparatus in general and boiler control apparatus in particular.

Control apparatus have been proposed heretofore for maintaining a supply of water to a boiler or for maintaining a liquid level in a container but it is highly desirable to provide, in conjunction therewith, means for shutting down the burner or other heating means for the boiler in event of failure of the water or liquid supply for some reason to thereby assure that there will be no explosion when the water level drops to a dangerous level notwithstanding the normal provision for automatically maintaining the liquid level by controlling the liquid supply. In this connection it is highly desirable to provide such a dual control for safeguarding the boiler wherein duplication of parts is minimized, consistent with maintaining the safeguarding character of the component parts of such dual control, wherein the burner will be shut down in event of failure of the water supply, and wherein the dual control is accomplished sharply, effectively and efficiently.

Other and further objects of this invention will be apparent as the same becomes better understood from an examination of the specification and claims in conjunction with the accompanying drawing wherein:

Figure 2:
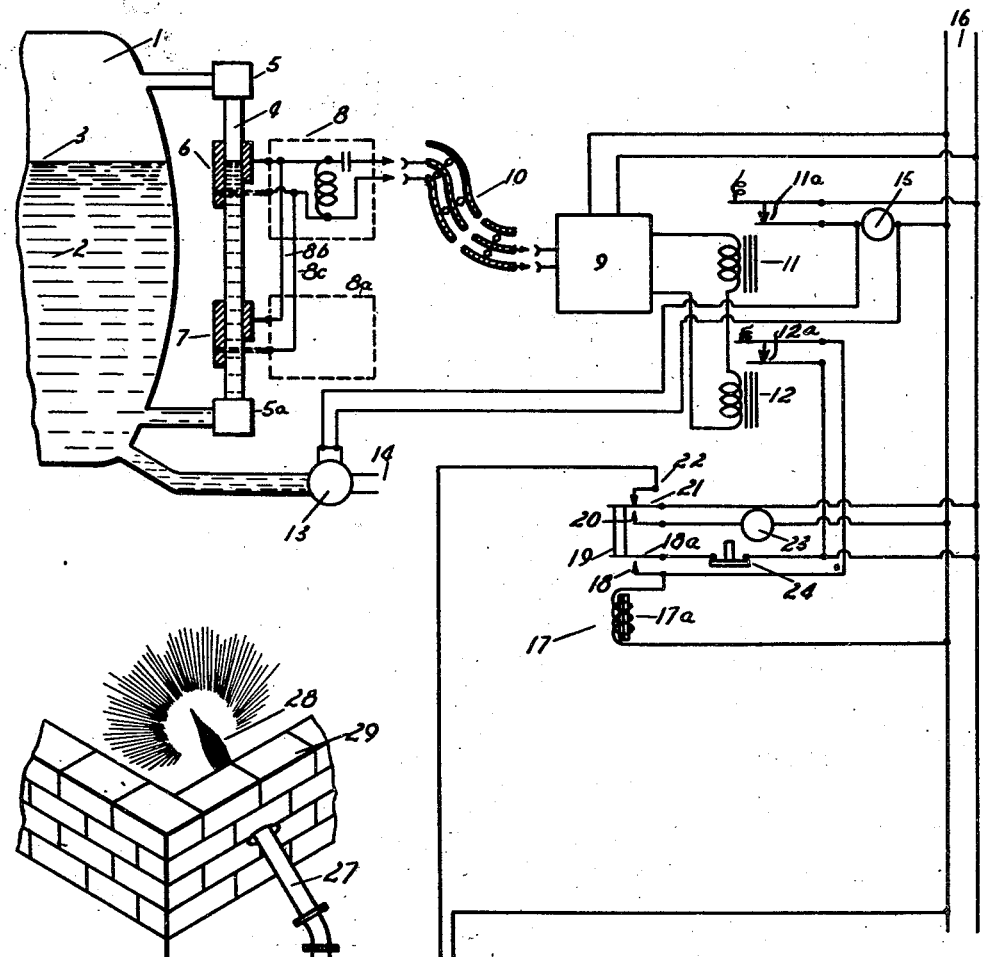
Figure 2 is a graphic illustration of the characteristics of the output current changes of the electronic apparatus in relation to the variations in capacity in the sensitive devices in the input of said electronic apparatus forming a part of the apparatus of Figure 1.
Figure 1:
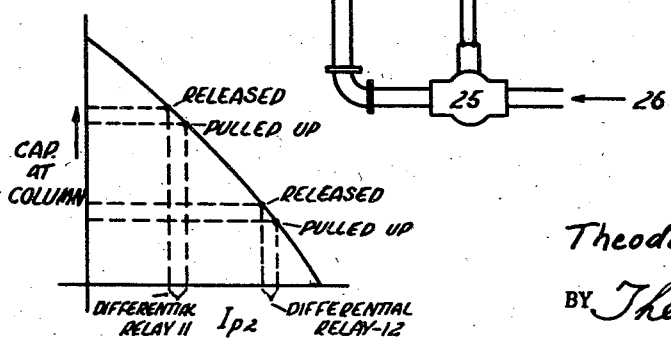
Figure 1 is a schematic and diagrammatic view of an apparatus embodying my invention.

Referring to the drawing, more particularly, reference character I designates a water drum of a boiler containing a liquid which may be water 2 normally at a level 3. The drum 1 is provided with the usual gauge glass 4 connected to fittings 5 and 5a communicating with the drum above and below, respectively, the level 3.

The gauge glass 4 has mounted thereon an upper liquid level pick up clip 6 situated at the normal liquid level 3. This clip 6 is similar to the clip 12 shown and described in my copending application Ser. No. 470,917 filed Dec. 31, 1942, for Control apparatus, executed Oct. 21, 1942, and acts as a pair of condenser plates forming a condenser, the capacity of which is increased by the rising of the liquid in the glass between the plates of the clip and decreased by the receding of the liquid. This clip 6 is connected to a self contained grid tank unit 8 substantially the same as the grid tank unit 14 of said copending application, with the exception hereinafter noted. A similar lower liquid level clip 7 is mounted on the glass 4 at a level corresponding with the hypothetical liquid level in the drum I which would be considered so dangerously low as to require shutting down of the fuel supply to the burner 27 hereinafter referred to.

This lower liquid level clip 7 also takes the form and function of a condenser having two plates and whose capacity is lowered when the water recedes between the said plates.

The unit 8 differs from the unit 14 of the aforesaid copending application only in that this second clip 7 is connected with its condenser in parallel with the condenser of clip 6 which is led to the opposite ends of the inductance in said unit 8, a pair of conductors 8b and 8c leading from said clip 7 to said opposite ends also.

The oscillating circuit of unit 8 is separably connected to a dual conductor cable 10 having a concentric conductor and conducting sheath, said cable being separably connected to an oscillator circuit 9, all of which unit 8, cable 10 and oscillator 9 are substantially the same, with the differences herein noted, as shown and described in the aforesaid copending application.

The principal difference between the electronic oscillator circuit 9 and the oscillator circuit in said copending application is that the latter circuit has only one relay (58) in its output plate circuit whereas in the present case there are two relays 11 and 12 respectively with their windings in series in the output plate circuit of the oscillator 9. These relays are chosen to pull up at widely different plate current levels. The characteristics, including the constants of the clips 6 and 7 and the windings of the relays 11 and 12, are so chosen and adjusted that when the liquid level is at normal level 3 in the drum 1, the output plate current of the oscillator 9 will be low and release the relay 11 to open contacts 11a and deenergize an electric supply valve 13, feeding boiler drum. When the liquid level recedes the reverse occurs to energize and open said valve as in the aforesaid copending application to maintain the liquid level 3. This system takes care of normal liquid level control. A pilot light 15 across valve 13 indicates to operator normal operation of control valve. Should the liquid level within drum I drop to and below the clip 7 as would be the case if there were a failure of liquid supply from source 14 or failure of valve 13 to operate, the relay 12 will pull up because it operates at a higher plate current level from that of relay 11. This different plate current level is caused by the further detuning of the oscillator circuit due to the impedance changes effected in the oscillating circuit within the unit 8 by the further capacity decrease which takes place in the clip 7 when the liquid level is lowered to and below the latter. The relationship between the capacities (with level changes) of the clips 6 and 7 and the resultant plate currents through the windings of the respective relays 11 and 12 and the operating ranges of these respective capacities and currents is shown in Figure 2.

The contacts 12a of relay 12 are closed as previously stated when the liquid level drops to a predetermined position within the clip 7 to shut off the fuel supply to the burner 27 but, although the relay contacts 12a will automatically open when the liquid level is restored, the burner fuel supply will not automatically be restored until a push button 24 has been operated to effect same.

This is accomplished by connections wherein contacts 12a, operated by relay 12, are interposed in circuit with the winding of a multi-contact third or control relay 17 and a normally closed push button 24 across the line supply 16.

Assuming that the contact 12a has been closed due to the pull up of the armature of relay 12 with a high plate current level coinciding to a level position below clip 7, current will flow from line supply through contact 12a to coil 17 whereupon armature 19 will pull up opening contact 22—21 to deenergize fuel supply valve 25 shutting down burner. Contact 21—20 will be made causing the energizing of alarm 23 as a warning to the operating engineer. Contact 18—18a will be closed so that any further change of contacting of 12a cannot disturb the locked up position of relay 17. The relay 11 is also pulled up with the high plate current level maintaining contact 11a closed and the water feeding control valve 13 open so that the boiler may be fed upon the resumption of liquid flow.

A normal closed push button 24, if depressed during the condition of liquid level below clip 7 has no effect in resetting relay 17, since the coil 17a remains energized through closed contact 12a and the alarm 23 continues to be energized. Should the level be restored above clip 7, oscillator approaches resonance as the capacity of clip 7 is increased, plate current falls, contact 12a opens and the operator may then depress push button 24 whereupon relay 17 now becomes deenergized restoring the valve 25 to open position to again supply fuel to the burner at the same time the alarm 23 is deenergized through opening of contact 21—20. The apparatus is now restored for normal liquid level control around clip 6.

This control relay 17 has contacts 21 and 22 which when closed and being in circuit with fuel valve 25 across the line during normal opening of the relay 17 maintain the fuel supply on by holding said valve open.

A pilot light or alarm bell 23 is energized by the closing of relay contact 20 which connects said light (or bell) across the line when relay 17 is energized. A contact 18 of relay 17 is closed by the energization of relay 17 to maintain the same energized by directly connecting the relay winding across the line, independently of contact 12a, until push button 24 has been operated to reset said relay.

The burner 27 extends through the furnace wall 29 to form a flame 28 for heating the boiler of which drum 1 is a part.

The advantages of the aforedescribed apparatus will be apparent without further detail.

I am aware that many changes may be made and details varied without departing from the principles of my invention and I therefore do not wish to be limited to the details shown or described.

I claim:

1. In combination, a liquid container, a liquid supply therefor, heating means for the container, liquid level impedance change responsive means responding to liquid level changes to and from predetermined normal liquid level in the boiler, a second liquid level impedance change responsive means responding to liquid level changes to and from a predetermined dangerously low liquid level in the container and electronic oscillator means operatively connected to both liquid level means having an electro-responsive device in its output circuit responsive to the first liquid level means for controlling the liquid supply in accordance with liquid level departures to and from normal level and having a second electro-responsive device in its output circuit responsive to the second liquid level means for controlling the heating means.

2. In combination, a container, a liquid supply therefor, heating means for the container, liquid level impedance change responsive means responding to liquid level changes to and from predetermined normal liquid level in the container, a second liquid level impedance change responsive means responding to liquid level changes to and from a predetermined dangerously low liquid level in the container and electronic oscillator means operatively connected to both liquid level means having an electro-responsive device in its output circuit responsive to the first liquid level means for controlling the liquid supply in accordance with liquid level departures to and from normal level and having a second electro-responsive device in its output circuit responsive to the second liquid level means for controlling the heating means and a control means for the heating means so connected between the second electro-responsive device and the heating means as to be operable by said second device only to shut off the heating means but not to restore same.

3. In combination, a container, a liquid supply therefor, heating means for container, liquid level impedance change responsive means responding to liquid level changes to and from pre-determined normal liquid level in the container, a second liquid level impedance change responsive means responding to liquid level changes to and from a predetermined dangerously low liquid level in the container and electronic oscillator means operatively connected to both liquid level means having an electro-responsive device in its output circuit responsive to the first liquid level departures to and from normal level for controlling the normal level and having a second electro-responsive device in its output circuit responsive to the second liquid level means for controlling the heating means, and initiating means and control means so connected between the second electro-responsive device and the heating means that the control means is operable by said second device to shut off the heating means but is not operable to restore the heating means without first operating the initiating means.

4. In combination, a container, a liquid supply therefor, heating means for the container, liquid level impedance change responsive means responding to liquid level changes to and from a predetermined normal liquid level in the container, a second liquid level impedance change responsive means responding to liquid level changes to and from a dangerously low liquid level in the container and an electronic oscillator controlled by both liquid level means and operatively connected to the liquid supply for automatically controlling the liquid level, and, also operatively connected to the heating means for shutting the same down when the liquid level approaches a dangerously low level.

5. In combination, a container, a liquid supply therefor, heating means for the container, liquid level impedance change responsive means responding to liquid level changes to and from a predetermined normal liquid level in the container, a second liquid level impedance change responsive means responding to liquid level changes to and from a dangerously low liquid level in the container, an electronic oscillator apparatus having a plurality of current levels in response to the respective liquid level means and relay apparatus in the output circuit of said electronic apparatus responsive to the respective current level for controlling the normal level of the liquid in the container and for cutting the heating means off when the liquid level approaches a dangerously low level.

6. In combination, a container, a liquid supply therefor, heating means for the container, liquid level impedance change responsive means responding to liquid level changes to and from normal liquid level in the container, a second liquid level means impedance change responsive to liquid level changes to and from a dangerously low liquid level in the container, an electronic oscillator apparatus controlled by both liquid level means and operatively connected to the liquid supply for maintaining the liquid level and also operatively connected to the heating means for shutting the same off when the liquid level approaches a dangerously low level, and control means interposed between the heating means and the electronic apparatus as to be operable thereby to shut off the heating means but not to restore same.

7. In combination, a container, a liquid supply therefor, heating means for the container, liquid level impedance change responsive means responding to liquid level changes to and from normal liquid level in the container, a second liquid level impedance change responsive means responsive to liquid level changes to and from a dangerously low liquid level in the container, an electronic oscillator apparatus controlled by both liquid level means and operatively connected to the liquid supply for maintaining the liquid level and also operatively connected to the heating means for shutting the same off when the liquid level approaches a dangerously low level and initiating and control means interposed between the heating means and the electronic apparatus whereby the latter may operate the control means to shut off the heating means but operation of the initiating means is necessary to restore the heating means.

8. In combination, a container, a liquid supply therefor auxiliary control means, liquid level impedance change responsive means responding to liquid level changes to and from a predetermined normal liquid level in the container, a second liquid level impedance change responsive means responding to liquid level changes to and from a dangerously low liquid level in the container and an electronic oscillator apparatus controlled by both liquid level responsive means and operatively connected to the liquid supply for automatically controlling the liquid level at a normal level and also operatively connected to the auxiliary means for controlling the same when the liquid level approaches a dangerously low level.

9. In combination, a container, a liquid supply therefor, heating means for the container, liquid level impedance change responsive apparatus having a plurality of operating ranges, one range responding to liquid level changes to and from a predetermined normal liquid level in the container and the other range responding to liquid level changes to and from a dangerously low level in the container and electronic oscillator means controlled by both ranges and operatively connected to the liquid supply for automatically controlling the liquid level and also operatively connected to the heating means for shutting the same down when the liquid level approaches a dangerously low level.

10. In combination, a container, a liquid supply therefor, burner control means, a manometer associated with the container, capacitor plate pickups responding to liquid level changes to and from a predetermined normal liquid level in the manometer, a second set of capacitor plate pickups responding to liquid level changes to and from a dangerously low liquid level in the manometer and an electronic oscillator apparatus controlled by both sets of capacitor plate pickups and operatively connected to the liquid supply for automatically controlling liquid level at a normal level and also operatively connected to the burner control means for controlling the same when the liquid level approaches a dangerously low level.

11. The combination of a container, a liquid supply therefor, heating means for the container, liquid level responsive apparatus, responding to liquid level changes to and from a predetermined normal liquid level in the container, an oscillator circuit spaced a substantial distance from the container, an oscillating circuit mechanically mounted in proximity to said liquid level responsive apparatus and operatively connected thereto for control thereby, a concentric conductor cable having its central conductor and sheath connected between terminals of said second circuit and the grid circuit of said first circuit and a second liquid level responsive apparatus responding to liquid level changes to and from a dangerously low liquid level in the container also operatively connected to said oscillating circuit for controlling the same, said oscillator circuit being operatively connected to said liquid supply for controlling same in accordance with said first liquid level responsive apparatus and being also operatively connected to said heating means for controlling the same in accordance with the second liquid level responsive apparatus.

THEODORE A. COHEN.